Nov. 7, 1967  L. MICHEL ETAL  3,351,307
DAMPED SUSPENSION SYSTEM
Filed March 29, 1965  3 Sheets-Sheet 1

LOUIS MICHEL
YVES PONCEL
RAYMOND PATRON
INVENTORS.

BY

Karl F. Ross
Attorney

Nov. 7, 1967    L. MICHEL ETAL    3,351,307
DAMPED SUSPENSION SYSTEM
Filed March 29, 1965    3 Sheets-Sheet 3

LOUIS MICHEL
YVES PONCEL
RAYMOND PATRON
INVENTORS.

BY Karl J. Ross
Attorney

United States Patent Office 3,351,307
Patented Nov. 7, 1967

3,351,307
DAMPED SUSPENSION SYSTEM
Louis Michel, Boulogne, Yves Poncel, Suresnes, and Raymond Patron, Meudon, France, assignors to Electronique Marcel Dassault, Paris, France, a corporation of France
Filed Mar. 29, 1965, Ser. No. 443,457
Claims priority, application France, May 6, 1964, 973,583
15 Claims. (Cl. 248—18)

Our present invention relates to a suspension system adapted to be used in an assembly wherein one part is subject to severe stresses due to changes in velocity (e.g. acceleration and/or vibration) whereas another part is to be protected from the effect of such stresses.

An assembly of this type exists, for example, in a missile or space vehicle propelled by one or more rocket stages and provided with an instrument capsule, warhead, satellite body or other structure containing sensitive equipment which must be guarded against excessive shocks on launching and/or in flight. The invention, however, also has more general applicability in any system in which a supported structure is to be substantially insulated from vibratile or other stresses in an associated supporting structure.

Conventional damping means designed to suppress vibrations in systems of this character were generally unsatisfactory, e.g. for the reason that they tended to stiffen and become ineffectual at high accelerations, or because they greatly encumbered the assembly so as to increase its weight and/or bulk to a degree which would be objectionable particularly in space vehicles. Also, hypercritically damped or aresonant mountings frequently give rise to stress concentrations which in turn may lead to localized oscillations of large amplitude.

It is, therefore, the general object of our present invention to provide a suspension system which avoids the above drawbacks and is especially adapted to be used in rocketry, e.g. for the protection of delicate equipment in an instrument capsule.

A more particular object of our invention is to provide a suspension system of this type which is of substantially isotropic character so as to be equally or nearly equally effective in all directions of stress.

It is also an object of this invention to provide improved vibration-damping means which can be interposed without major structural changes between a supported element and a carrier therefor.

We have found, in accordance with this invention, that an effective suspension system of the character set forth, designed to protect a supported structure against excessive stresses due to impact, acceleration and/or vibration, can be most effectively constructed from one or more flexible webs each composed of lacing of monofilamentary polymeric thread of limited elasticity, such as nylon or Teflon, passing back and forth across an annular gap formed between confronting surfaces of the supporting and supported structures with freedom of frictional displacement relative to these structures which, for this purpose, are advantageously provided with perforated flanges receiving the laced thread in their perforations. We have discovered that the frictional engagement between the thread and the two interconnected structures creates effective damping, particularly in the region of the higher vibration frequencies (e.g. upwards of 50 cycles per second), and that this damping characteristic is not markedly affected by acceleration even when the latter reaches a value of 20 G's or higher.

The aforedescribed damping effect, resulting from the frictional engagement of a laced plastic thread with a pair of spaced elements to which it is attached, can be even further enhanced if a plurality of strands of substantially inextensible plastic material (e.g. polyamide) are twisted or woven together to form the thread. A braided nylon thread, for example, has been found especially effective, the external friction between the thread and its moorings being supplemented by the internal friction between the several strands.

Suspension systems according to our invention may be designated in a variety of shapes and sizes, including very compact assemblies of only a few centimeters in diameter.

Whereas in a simple situation it will be sufficient to use but a single planar web disposed in the plane in which the principal vibratile stresses are expected (e.g. transverse to the axis of symmetry of the supporting structure in the case of a generally cylindrical instrument housing or the like), conditions may arise in which it is necessary to prevent the transmission of both axial and transverse stresses to the supported structure. In this instance, according to a further feature of our invention, we propose to employ a plurality of webs extending symmetrically in opposite direction from a common plane, e.g. the aforementioned transverse plane which may also be the plane of the supported structure if the latter has the form of a mounting plate or disk. If the symmetrically oriented webs are inclined with reference to this transverse plane so as to define opposite frustoconical surfaces centered on the principal axis, their respective generatrices may extend at right angles to each other (and therefore at 45° to the axis) for achieving an isotropic effect. It is also possible, however, to combine a planar web with two further webs diverging symmetrically from the plane thereof, e.g. frustoconically or, preferably, along a common cylindrical surface so as to absorb axial stresses while the first web insulates against radial vibrations.

In order that the present improvement may also be utilized in existing structures having a fixed base for the mounting of sensitive equipment, we propose in accordance with a further feature of this invention to design the supporting structure as a generally cylindrical collar with an edge having means, e.g. a radially extending formation such as a flange, by which it can be secured to a base, the supported structure being a platform concentrically received within the collar at a location axially offset from that edge and provided in turn with means for attaching one or more instruments or other devices.

The above and other features and advantages will become more readily apparent from the following detailed description of certain embodiments, reference being made to the accompanying drawing in which.

Figure 1:
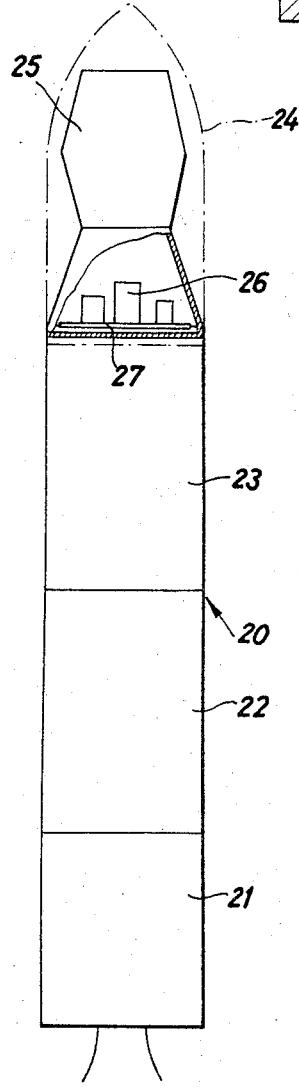
FIG. 1 is an overall elevational view of a multistage rocket provided with an instrument capsule embodying the invention.

In FIG. 1 we have shown a multistage rocket 20 illustrated, by way of example, as consisting of three stages 21, 22 and 23 together with a nose cone 24, the latter surrounding an instrument capsule 25 to be carried into orbit. A group of sensitive instruments 26 are housed within the capsule 25 and are supported on a carrier member or platform 27 movably suspended in the lower part of the capsule. Nose cone 24, shown in dot-dash lines, is subsequently jettisoned.

Figure 2:
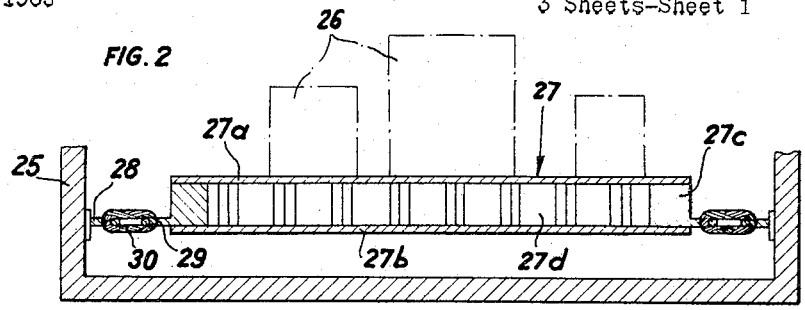
FIG. 2 is an enlarged cross-sectional view of an instrument-supporting platform suspended within the capsule of FIG. 1.
Figure 3:
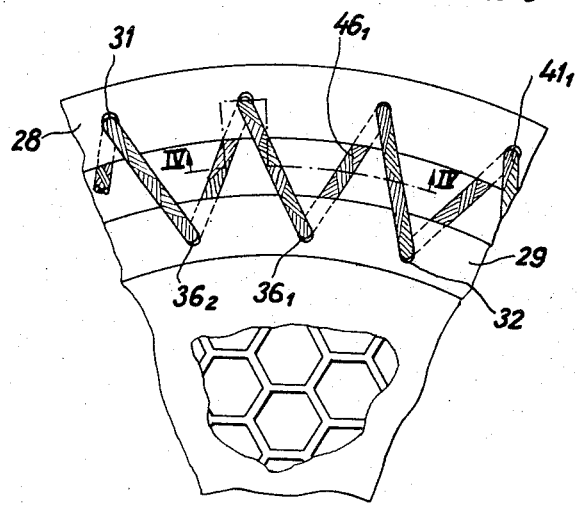
FIG. 3 is a fragmentary plan view, drawn to a larger scale, of the platform and associated structure shown in FIG. 2.
Figure 4:
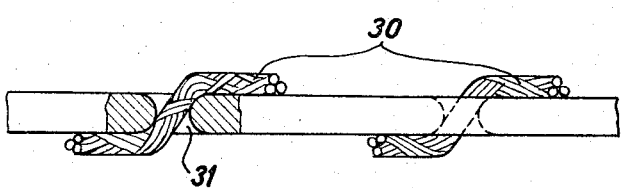
FIG. 4 is a fragmentary sectional view taken along line IV—IV of FIG. 3, drawn to a larger scale.

A damped suspension system designed to hold the platform 27 inside the housing 25, spaced from its bottom and its walls, has been illustrated in FIGS. 2–4. As shown in FIG. 2, platform 27 comprises an upper and a lower metal plate 27a, 27b separated by a peripheral ring 27c, the interior of this structure being occupied by a filler 27d which may consist of balsa wood or other lightweight material and is here shown to have a honeycomb-type cellular structure (see also FIG. 3). Two confronting flanges 28 and 29, respectively rigid with capsule housing 25 and platform ring 27c, define an annular gap spanned by a web 30 consisting of a lacing of substantially inelastic monofilamentary polymeric thread, such as polyamide (nylon) or polytetrafluoroethylene (Teflon), the laced thread being advantageously composed of several strands braided together. Flanges 28 and 29 are formed with staggered perforations 31, 32 which, as best seen in FIG. 4, are flared and rounded at their ends to accommodate the thread 30 without kinking and with freedom of relative sliding motion against a moderate frictional resistance. The thread 30 passes back and forth under tension between the two perforated flanges 28, 29, each pass being stretched taut upon its insertion into a hole 31 or 32.

Figure 5:
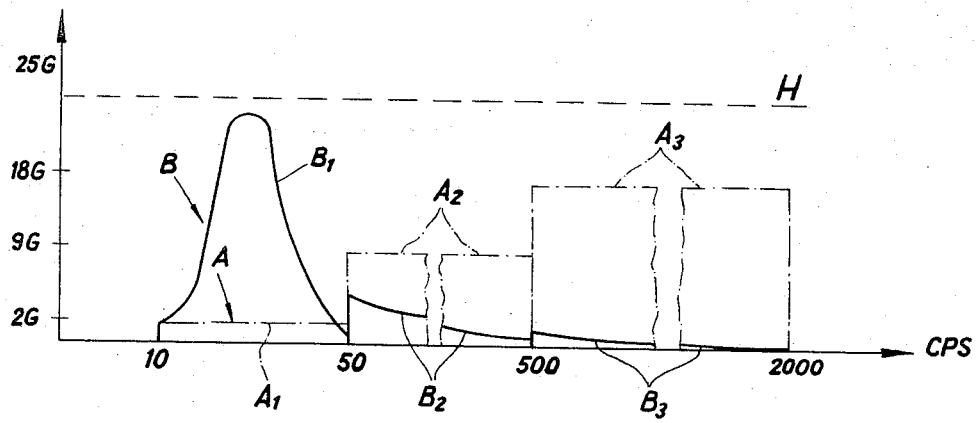
FIG. 5 is a graph illustrating the performance of an assembly of the type shown in FIGS. 2–4.

The graph of FIG. 5 serves to illustrate the results of tests to which the assembly of FIGS. 2–4 was subjected to determine the damping effect of the suspension 28–30. In these tests, housing 25 was rigidly mounted within the frame of a vibration chamber successively subjected to transverse oscillations, at frequencies ranging from 10 to 2000 c.p.s., as indicated along the abscissa in FIG. 5; the intensity of these forced vibrations increased progressively, in terms of the maximum acceleration involved, from 2 G at the lower frequencies up to 18 G in the higher frequency range. The magnitude of these accelerations has been plotted in FIG. 5 as a dot-dash curve A having portions $A_1$ (2 G) from 10 to 50 c.p.s., $A_2$ (9 G) from 50 to 500 c.p.s. and $A_3$ (18 G) from 500 to 2000 c.p.s. The intensity of the vibrations communicated to the supported platform 27 is plotted in full lines at B, this curve having portions $B_1$, $B_2$ and $B_3$ in the regions of curve portions $A_1$, $A_2$ and $A_3$, respectively. Curve B indicates that the system has a natural frequency in the low-frequency range, i.e. around 25 c.p.s.; at this natural frequency the imposed vibrations are amplified so that the peak of curve B reaches a value slightly below a horizontal line H which represents a maximum permissible acceleration of 25 G as read on the ordinate of the graph.

FIG. 5 also shows that the vibration transmissivity of our improved suspension system decreases rapidly beyond 50 c.p.s. so that accelerations of only a fraction of 1 G are transmitted to the equipment 26 in this frequency range where, as indicated by the curve A, the vibrations of the surrounding capsule are quite intense.

A representative assembly of the type illustrated in FIGS. 2–4, performing substantially in the manner shown in FIG. 5, had a central platform 27 with a diameter of 50 cm. and a thickness of 15 mm.; the cover plates 27a, 27b were made from magnesium sheet of 6 mm. thickness. The total weight of the platform together with the supported equipment was 12 kg. The circular gap defined by flanges 28 and 29, each of which had a thickness of 2 mm., was 1 cm. in width. The braided nylon thread constituting the web 30 had a diameter of 2 mm. and a tensile strength of 85 kg. A total of 72 perforations were provided in flange 28, along with a like number of perforations in flange 29, the separation between the perforations of either set being thus about 20 mm. At the natural frequency of 24 c.p.s., with an impressed acceleration of 40 G, the relative displacement between platform 27 and housing 25 was about 5 mm.

Similar results were obtained upon the substitution of braided Teflon for braided nylon, the Teflon being in addition more stable with variation in temperature.

Figure 6:
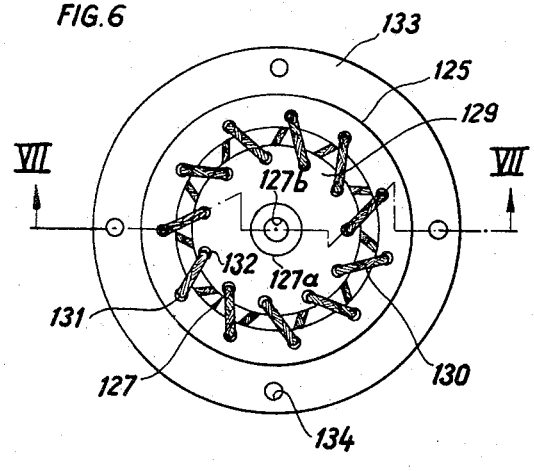
FIG. 6 is an overall plan view of a modified suspension system according to the invention.
Figure 7:
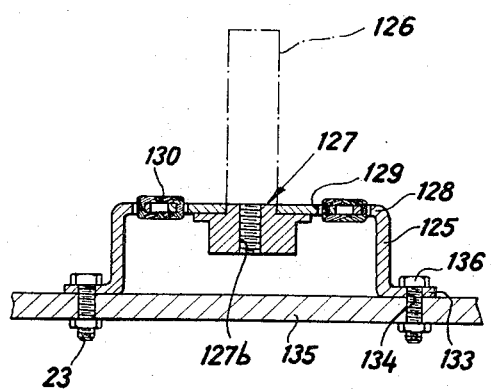
FIG. 7 is a cross-sectional view taken on line VII—VII of FIG. 6.

In FIGS. 6 and 7 we have shown a modification of the system of FIGS. 2–4 designed to facilitate the mounting of sensitive devices on an existing base such as, for example, the bottom of the capsule 25 of FIGS. 1 and 2. To this end we provide, as an external supporting structure, a cylindrical collar 125 having an inner top flange 128 with perforations 131 and further having an outer bottom flange 133 with mounting holes 134 for attaching it to a base 135, e.g. with the aid of bolts 136. The supported inner structure is here shown as a platform 127 with a peripheral flange 129 having perforations 132, a base 127a depending from this flange and being formed with a threaded center bore 127b to facilitate its attachment to a device to be protected against external vibratile stresses as indicated in dot-dash lines at 126.

A planar web 130, similar to the web 30 of the preceding embodiment consists of an endless thread which interconnects the two structures 125, 127 by being laced through the staggered perforations 131, 132 thereof.

Figure 8:
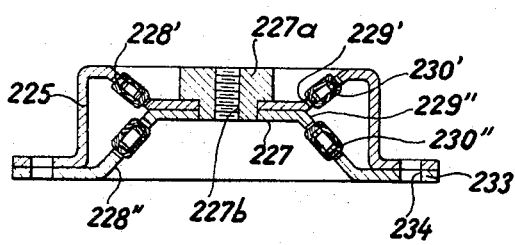
FIG. 8 is a cross-sectional view similar to FIG. 7, illustrating a further modification.

The axial spacing between flanges 129 and 133 is chosen large enough to prevent contact between the base 127a and the base 135 even under conditions of maximum axial acceleration, oscillatory or other. Where this axial acceleration attains significant magnitudes, the single-web construction shown in FIGS. 1–4, 6 and 7 may be replaced by a suspension system with two or more webs adapted to absorb both axial and radial stresses. In FIG. 8, for example, we have shown a collar 225 with an inner upper flange 228′, an outer lower flange 233 and an inner lower flange 228″, the two inner flanges 228′, 228″ converging frustoconically toward each other and serving as anchorages for two frustoconical webs 230′, 230″. Confronting flanges 229′, 229″, respectively engaged by these webs, are formed on a central platform 227 having an upstanding boss 227a with an axial bore 227b which, if desired, can also be threaded like the bore 127b of FIGS. 6 and 7. The generatrices of the two frustoconical surfaces defined by webs 230′ and 230″ extend at right angles to each other and include 45° angles with the horizontal, thus extending symmetrically with reference to the plane of platform 227. The tensile stresses developed in the threads of webs 230′ and 230″ will therefore have equal components in both the horizontal and the vertical direction. Flange 233 has mounting holes 234 for attaching it to a base not shown. The threads of webs 230′, 230″ pass through perforations in the flanges 228′, 229′ and 228″, 229″ with limited frictional resistance as described above.

Figure 9:
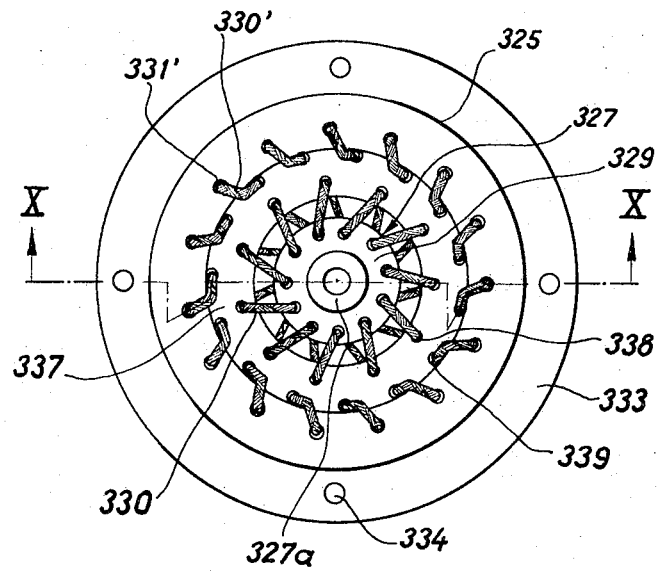
FIG. 9 is a plan view, similar to FIG. 6, of still another embodiment.
Figure 10:
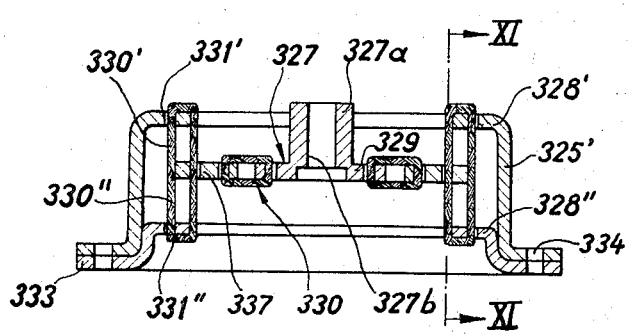
FIG. 10 is a cross-sectional view taken on line X—X of FIG. 9.
Figure 11:
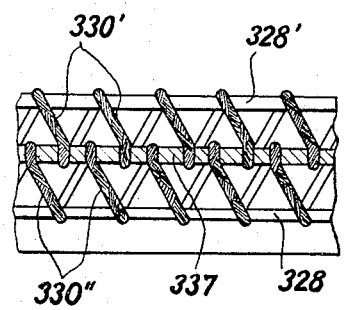
FIG. 11 is a fragmentary sectional view taken on line XI—XI of FIG. 10.

In the embodiment of FIGS. 9–11 we have shown a collar 325 with an outer bottom flange 333 and axially spaced inner flanges 328′, 328″, the principal difference between this collar and the structure 225 of FIG. 8 being that the inner flanges 328′, 328″ are flat and lie in radial planes instead of converging frustoconically. A central platform 327 is generally similar to platform 127 of FIGS. 6 and 7, apart from having an upstanding boss 327a traversed by a bore 327b. A peripheral flange portion 329 of this platform lies in a plane midway between those of flanges 328′ and 328″; a ring 337 spacedly surrounds the flange 329 within its plane and is provided with perforations 338, 339 respectively traversed by laces 330, 330′, 330″ constituting a horizontal web coplanar with flange 329 and two vertical webs on a common cylindrical surface coaxial with platform 327 and collar 325. The threads of the laced web 330 also pass through perforations 332 in flange 329, the webs 330', 330" being anchored in perforations 331', 331", respectively, of flanges 330', 330". Mounting holes 334 are again provided in the outer bottom flange 333 of the supporting structure 325.

It will be apparent that the webs 330', 330" absorb downwardly and upwardly directed vertical stresses whereas the web 330 insulates against all vibrations or other forces acting in a horizontal direction. As seen in FIG. 11, the threads of webs 330' and 330" are relatively staggered so that their loops pass through alternate holes 338 in ring 337; this, however, is not absolutely necessary and the same perforations could be used by both threads.

Naturally, multiweb systems of the type shown in FIGS. 8–11 can also be used in an assembly of the character illustrated in FIGS. 1–4 wherein the supporting structure is constituted by a surrounding housing wall rather than by a collar attached to a base. Also, more than one device 126 could be supported on the platforms of FIGS. 7–11, with suitable increase in the number of mounting holes and distribution thereof over the surface of the platform. These and other modifications, readily apparent to persons skilled in the art, are intended to be embraced within the spirit and scope of our invention as defined in the appended claims.

We claim:

1. A suspension system comprising a primary structure subject to severe stresses due to changes in velocity, a secondary structure to be protected from said stresses, said structures having confronting peripheral surfaces with perforated concentric flanges separated by an annular gap, and tie means interconnecting said structures, said tie means including at least one flexible web composed of lacing of tensioned monofilamentary polymeric thread of limited elasticity threaded through said surfaces with freedom of frictional sliding displacement relative thereto by traversing said perforations and passing back and forth between said flanges throughout said gap.

2. A system as defined in claim 1 wherein the material of said thread is selected from the group which consists of nylon and Teflon.

3. A system as defined in claim 2 wherein said thread consists of braided nylon.

4. A suspension system comprising an outer supporting structure subject to severe stresses due to changes in velocity, an inner supported structure to be protected from said stresses, said structures having confronting peripheral surfaces with perforated concentric flanges separated by a circular gap, and tie means interconnecting said structures, said tie means including at least one flexible web composed of lacing of tensioned monofilamentary polymeric thread of limited elasticity threaded through said surfaces with freedom from frictional sliding displacement relative thereto by traversing said perforations and passing back and forth between said flanges throughout said gap.

5. A suspension system comprising a supporting structure subject to severe stresses due to changes in velocity, a generally planar supported structure to be protected from said stresses, said structures having confronting peripheral surfaces separated by an annular gap, and tie means interconnecting said structures, said tie means including a plurality of webs each composed of lacing of tensioned monofilamentary polymeric thread of limited elasticity threaded through said surfaces with freedom of frictional displacement relative thereto and passing back and forth between said surfaces throughout said gap, two of said webs extending symmetrically in opposite directions from the plane of said supported structure.

6. A suspension system as defined in claim 5 wherein said tie means further includes a ring spaced from said surfaces and disposed in said plane within said gap, the confronting peripheral surface of said supporting structure being provided with a pair of parallel flanges extending toward said supported structure on opposite sides of said plane, said two of said webs being threaded through said ring and through respective ones of said flanges, a third of said webs extending within said plane and being anchored to said ring and to the confronting surface of said supported structure.

7. A system as defined in claim 6 wherein said two of said webs lie on a common cylindrical surface coaxial with said confronting surfaces.

8. A system as defined in claim 5 wherein said two of said webs diverge from the confronting surface of said supported structure toward the confronting surface of said supporting structure.

9. The system as defined in claim 8 wherein said two of said webs lie on respective frustoconical surfaces with substantially mutually perpendicular generatrices.

10. A suspension system comprising an outer structure subject to severe stresses due to changes in velocity, a generally planar inner structure to be protected from said said stresses, said structures having confronting concentric surfaces separated by a circular gap, and tie means interconnecting said structures, said tie means including at least one flexible web composed of endless lacing of tensioned monofilamentary polymeric thread of limited elasticity threaded through said surfaces with freedom of frictional sliding displacement relative thereto and passing back and forth between said surfaces throughout said gap.

11. A suspension system comprising an outer structure subject to severe stresses due to changes in velocity, a generally planar inner structure to be protected from said stresses, said structure having confronting concentric surfaces separated by a circular gap, and tie means interconnecting said structures, said tie means including a plurality of flexible webs each composed of lacing of tensioned monofilamentary polymeric thread of limited elasticity threaded through said surfaces with freedom of frictional displacement relative thereto and passing back and forth between said surfaces throughout said gap, two of said webs extending symmetrically in opposite directions from the plane of said supporting structure.

12. A suspension system comprising an outer structure subject to severe stresses due to changes in velocity, a generally planar structure to be protected from said stresses, said structures having confronting concentric perforated flanges separated by a circular gap, and tie means interconnecting said structures, said tie means including at least one flexible web composed of lacing of tensioned monofilamentary polymeric threaded of limited elasticity threaded through said flanges with freedom of frictional sliding displacement relative thereto by passing back and forth in the perforations thereof throughout said gap.

13. A suspension system comprising an outer structure subject to severe stresses due to changes in velocity, a generally planar inner structure to be protected from said stresses, said structures having confronting concentric perforated flanges separated by a circular gap, and tie means interconnecting said structures, said tie means including a plurality of flexible webs each composed of endless lacing of tensioned monofilamentary polymeric thread of limited elasticity threaded through said flanges with freedom of frictional displacement relative thereto by passing back and forth in the perforations thereof throughout said gap, two of said webs extending symmetrically in opposite directions from the plane of said supported structure.

14. A suspension system comprising a generally cylindrical collar having an edge provided with means for attaching said collar to a base subject to severe stresses due to changes in velocity, a substantially flat platform to be protected from said stresses, said platform being received with all-around annular clearance within said collar at a location axially spaced from said edge, and tie means interconnecting said collar and platform, said tie means including at least one flexible web composed of lacing of tensioned monofilamentary polymeric thread of limited elasticity threaded through said collar and said platform with freedom of frictional displacement relative thereto and pasisng back and forth therebetween across said clearance.

15. A system as defined in claim 14 wherein said collar is provided with at least one inner annular flange confronting the peripheray of said platform, said flange and said periphery being provided with staggered perforations traversed by said lacing.

References Cited

UNITED STATES PATENTS

| | | | |
|---|---|---|---|
| 2,924,419 | 2/1960 | Wells | 248—358.1 |
| 3,037,728 | 6/1962 | Kerley et al. | 248—18 |
| 3,086,600 | 4/1963 | Kerley et al. | 248—350 X |
| 3,204,911 | 9/1965 | Lowrence et al. | 248—358 |

JOHN PETO, *Primary Examiner.*